US012595853B2

(12) United States Patent
Drienovsky et al.

(10) Patent No.: US 12,595,853 B2
(45) Date of Patent: Apr. 7, 2026

(54) VALVE ARRANGEMENT

(71) Applicant: Vitesco Technologies GmbH, Regensburg (DE)

(72) Inventors: Mihai Drienovsky, Timisoara (RO); Deian Rasici, Timisoara (RO); Alexandru Popa, Timisoara (RO); Dmytro Rozputniak, Deva (RO); Pavel-Sorin Han, Horea (RO); Cosmin Ion Belin, Timisoara (RO); Robert-Marian Chitac, Drobeta Turnu Severin (RO)

(73) Assignee: Vitesco Technologies GmbH, Regensburg (DE)

( * ) Notice: Subject to any disclaimer, the term of this patent is extended or adjusted under 35 U.S.C. 154(b) by 46 days.

(21) Appl. No.: 18/561,943

(22) PCT Filed: May 18, 2022

(86) PCT No.: PCT/EP2022/063459
§ 371 (c)(1),
(2) Date: Nov. 17, 2023

(87) PCT Pub. No.: WO2022/243384
PCT Pub. Date: Nov. 24, 2022

(65) Prior Publication Data
US 2024/0240717 A1       Jul. 18, 2024

(30) Foreign Application Priority Data

May 19, 2021   (EP) ..................................... 21465521
May 21, 2021   (DE) ..................... 10 2021 205 250.9

(51) Int. Cl.
*F16K 1/20*            (2006.01)
*F16K 1/18*            (2006.01)
*F16K 1/32*            (2006.01)

(52) U.S. Cl.
CPC .................. *F16K 1/18* (2013.01); *F16K 1/20* (2013.01); *F16K 1/32* (2013.01)

(58) Field of Classification Search
CPC ..... F16K 1/18; F16K 1/20; F16K 1/22; F16K 1/32
See application file for complete search history.

(56) References Cited

U.S. PATENT DOCUMENTS 3,862,740 A * 1/1975 Gallagher ................. F16K 1/22
                                                      251/173
4,154,426 A       5/1979 Hochain et al.
(Continued)

FOREIGN PATENT DOCUMENTS

CN          2457407          10/2001
DE          2414731          6/1979
(Continued)

OTHER PUBLICATIONS

Office Action of Corresponding German Patent Application No. 10 2021 205 250.9, dated Jan. 18, 2022.
(Continued)

*Primary Examiner* — Kevin F Murphy
(74) *Attorney, Agent, or Firm* — COZEN O"CONNOR

(57)                ABSTRACT

A valve arrangement, having a housing with a fluid line and a valve arranged in the fluid line which has a valve seat, a valve flap, and a valve opening, the valve flap being pivotable about a pivot axis between a closed position, in which the valve flap lies against the valve seat and closes the valve in fluid-tight fashion, and an open position, in which valve flap opens up the valve opening. The valve flap, in the closed position, defining an X-Y plane of a coordinate system and the pivot axis being arranged with a spacing to the X-Y plane and defining the Y direction of the coordinate system. An alignment mechanism aligns the arrangement in which the valve flap is situated relative to the valve seat in
(Continued)

the closed position to be is alignable and fixable at least in the X direction.

13 Claims, 6 Drawing Sheets

(56)                References Cited

U.S. PATENT DOCUMENTS

| | | | | |
|---|---|---|---|---|
| 4,436,281 | A | 3/1984 | Chiron | |
| 4,480,815 | A | 11/1984 | Kreij | |
| 4,682,758 | A * | 7/1987 | Scobie | F16K 1/22 |
| | | | | 251/84 |
| 4,711,427 | A * | 12/1987 | Holtgraver | F16K 1/22 |
| | | | | 29/434 |
| 7,849,684 | B2 * | 12/2010 | Gerards | F16K 1/22 |
| | | | | 60/299 |
| 10,167,785 | B2 * | 1/2019 | Oblinger | F16K 1/22 |
| 2008/0050625 | A1 * | 2/2008 | Kaimann | F16K 1/22 |
| | | | | 429/513 |
| 2010/0032598 | A1 | 2/2010 | Iwabuchi | |
| 2011/0272613 | A1 | 11/2011 | Watanuki et al. | |
| 2016/0032794 | A1 * | 2/2016 | Fischer | F16K 1/224 |
| | | | | 251/305 |
| 2018/0266567 | A1 | 9/2018 | Hadley et al. | |
| 2019/0136981 | A1 | 5/2019 | Inagaki et al. | |
| 2019/0203673 | A1 | 7/2019 | Inagaki et al. | |

FOREIGN PATENT DOCUMENTS

| | | |
|---|---|---|
| DE | 3203711 | 8/1983 |
| DE | 3533937 | 12/1986 |
| DE | 112007003165 | 12/2009 |
| DE | 102013201992 | 8/2014 |
| DE | 102018214069 | 2/2020 |
| DE | 10196926 | 2/2021 |
| EP | 2299151 | 3/2011 |
| EP | 2530284 | 12/2012 |
| EP | 2949974 | 12/2015 |
| GB | 2516094 | 1/2015 |
| JP | S62149416 | 7/1987 |
| JP | 2010135253 | 6/2010 |
| JP | 2011058536 | 3/2011 |
| JP | 2015218833 | 12/2015 |
| WO | 8607122 | 12/1986 |
| WO | 2014175886 | 10/2014 |

OTHER PUBLICATIONS

Office Acton of corresponding Japanese Patent Application No. 2023-571609, dated Oct. 15, 2024.

Office Action of corresponding Japanese Patent Application No. 2023-571609, dated Jan. 27, 2025.

Office Action of corresponding European Patent Application No. 22729600.1, dated Jul. 8, 2025.

* cited by examiner

VALVE ARRANGEMENT

CROSS REFERENCE TO RELATED APPLICATIONS

This is a U.S. national stage of Application No. PCT/EP2022/063459 filed May 18, 2022. Priority is claimed on European Application No. EP 21465521.9 filed May 19, 2021, and German Application No. DE 10 2021 205 250.9 filed May 21, 2021, the content of which is incorporated herein by reference.

BACKGROUND OF THE INVENTION

1. Field of the Invention

The disclosure relates to a valve arrangement, in particular for a gas line, in particular for a gas line of a fuel cell arrangement, and/or of a motor vehicle drive arrangement.

2. Description of the Related Art

Valves for opening and closing lines, in particular gas lines, must satisfy a variety of requirements. For example, as close as possible perfect seal should be achieved when a valve is closed, and at the same time the valve should be capable of being actuated with the lowest possible actuation forces. With regard to the service life, but also in order to avoid contamination, the least possible wear should be ensured in the region of the sealing surfaces that interact with one another. If the valve arrangement is used for example for a hydrogen fuel cell, the leak-tightness when the valve is closed plays a particularly major role because, when the drive is inactive, an ingress of air or oxygen must be prevented in order to prevent corrosion of the fuel cell.

To satisfy the stated requirements to the greatest possible degree, so-called butterfly valves are commonly used. In the case of such butterfly valves, the valve flap performs a pivoting movement about a pivot axis arranged more or less centrally within the gas line. Such butterfly valves can normally be actuated with relatively low actuating forces but require relatively high manufacturing outlay to attain an optimum seal and low wear.

Document EP 2 299 151 A2 discloses a butterfly valve in which the pivot axis of a valve disk is arranged to be offset in two directions. A surface that forms the valve seat is of partially conical form.

Document GB 2516094 A discloses a butterfly valve in which the pivot axis of a valve element is arranged to be offset in two directions. A surface that forms the valve seat is of conical form.

Document WO 2014/175886 A1 discloses a butterfly valve in which the pivot axis of a valve element is arranged to be offset in two directions. On the valve element, there is formed a circularly encircling, blade-like edge that comes into contact with the valve seat in the closed position.

Documents US 2011/0272613 A1, US 2019/0203676 A1 and US 2019/0136981 A1 each disclose butterfly valves for exhaust-gas recirculation systems.

SUMMARY OF THE INVENTION

It is an object of one aspect of the invention to provide a valve arrangement which, in particular in the case of use with a fuel cell, satisfies the high requirements and is particularly easy to manufacture.

The valve arrangement is provided in particular for a gas line, in particular for a gas line of a fuel cell arrangement, and/or of a motor vehicle drive arrangement. The valve arrangement has a housing with a fluid line and has a valve arranged in the fluid line and which has a valve seat, a valve flap, and a valve opening, the valve flap being pivotable about a pivot axis between a closed position, in which the valve flap lies against the valve seat and closes the valve opening in fluid-tight fashion, and an open position, in which the valve flap opens up the valve opening, the valve flap, in the closed position, defining the X-Y plane of a coordinate system and the pivot axis being arranged with a spacing to the X-Y plane and defining the Y direction of the coordinate system. The valve arrangement is characterized by an alignment mechanism by which the arrangement in which the valve flap is situated relative to the valve seat in the closed position is alignable and fixable at least in the X direction.

The fluid line may have a line axis arranged substantially in the Z direction of the coordinate system that is to say approximately perpendicular to the plane of the valve flap in the closed position. The valve flap is pivotable about a pivot axis such that it can pivot back and forth between the closed position and the open position. For this purpose, the valve arrangement may have a pivoting drive, in particular with an electric actuator. The pivoting drive may be integrated into the housing of the valve arrangement. It is however likewise possible for the valve arrangement to be used without a pivoting drive, for example as a check valve.

The valve may have an elastic seal arranged either on the valve flap or on the valve seat. For this purpose, a separate sealing element may be produced from an elastic material and connected to the valve seat or the valve flap; for example, an O-ring may be inserted into a groove that encircles the valve flap. Such a separate seal is expedient in particular if the valve flap or the valve seat is produced in a cutting process, for example from metal. If the valve seat or the valve flap is produced by injection molding, in particular from plastic, the elastic seal may be placed or molded as a separate part into the production mold.

The pivot axis of the valve flap is arranged with a spacing to the X-Y plane, which is to say to the plane of the valve flap in the closed position. It is thus situated "outside the valve flap" and arranged offset in relation to the plane in which the valve seat is arranged. The pivot axis may in particular likewise be arranged offset relative to the line axis in the X direction. This arrangement of the pivot axis is known from butterfly valves and is also referred to as a doubly offset arrangement.

According to one aspect of the invention, the valve arrangement has an alignment mechanism by which the arrangement in which the valve flap is situated relative to the valve seat in the closed position is alignable and fixable at least in the X direction. In the case of known valve arrangements, the alignment of the valve flap in the X direction is predefined by the pivot axis and cannot be adjusted. This makes it necessary for the tolerances that are unavoidable during the production and assembly processes to be kept small and/or to be compensated by generously dimensioned elastic seals. In the case of the invention, it is instead possible for the arrangement of the valve flap, in the closed position, to be aligned in order to compensate the unavoidable tolerances, and for the valve flap to subsequently be fixed in this aligned position. In this way, a very good seal can be attained without relatively high actuating forces and a relatively high degree of wear occurring.

In one refinement, the arrangement in which the valve flap is situated relative to the valve seat in the closed position is alignable and fixable additionally in the Y direction by the alignment mechanism. A fine adjustment is thus also possible in the direction of the pivot axis by the alignment mechanism.

In one refinement, the arrangement in which the valve flap is situated relative to the valve seat in the closed position is alignable and fixable additionally in the Z direction by the alignment mechanism. By this additional possibility of alignment, it is possible for the position of the valve flap to be adjusted not only in the valve plane but also in the direction of the line axis. This allows in particular influencing of the contact pressure on an elastic seal that is arranged between valve seat and valve flap.

In one refinement, the valve has a shaft for pivoting the valve flap, the alignment mechanism relating to the fastening of the valve flap to the shaft. The shaft may in particular be connected to an actuating drive arranged outside the line and for example in the housing. In the butterfly valves known from the prior art, the valve flap is fixedly connected to the shaft without the possibility of a fine adjustment, in particular by being pressed on. According to one aspect, an alignment mechanism is provided that acts between the shaft and valve flap and by which the arrangement of the valve flap relative to the shaft can be adjusted. In this way, the arrangement of the valve flap can be easily set without the need for structural modifications to the actuating drive or to the bearing arrangement of the shaft.

In one refinement, the alignment mechanism has a screw fastening of the valve flap to the shaft. In this way, the arrangement of the valve flap relative to the shaft can be easily adjusted before the tightening of the screws.

In one refinement, the shaft has at least one passage hole in which a screw of the screw fastening is arranged, and a planar, first abutment surface, which surrounds the passage hole at a side of the shaft facing toward the valve flap and braced together with the valve flap by the screw fastening. A simple and secure fastening of the valve flap to the shaft is realized in this way. With the first abutment surface of the shaft, the arrangement of the valve flap in the Z direction (in the closed position) can be fixedly predefined, though the desired possibility of alignment exists in the plane of the valve flap (X and/or Y direction).

In one refinement, the outer diameter of the screw is smaller than a cross-sectional dimension of the passage hole in order to allow an alignment in the X-Y plane. The screw is thus fitted into the passage hole not exactly but with play owing to the stated coordination of the outer diameter of the screw with the cross-sectional dimension of the passage hole, such that the arrangement of the valve flap in the X-Y plane is fixed for the first time as a result of the tightening of the screw. The passage hole may be circular in cross section, and in this case the cross-sectional dimension corresponds to the inner diameter of the passage hole. The passage hole may however also have an elongate, elliptical or other cross-sectional geometry, in particular may be designed as a slot. In this case, the cross-sectional dimension corresponds to a maximum opening width of the passage hole. In particular, the outer diameter of the screw may be at least 2%, at least 10% or at least 15% smaller than the cross-sectional dimension of the passage hole. The resulting play is sufficient for the desired alignment. A lower limit for the outer diameter of the screw is specified by the strength requirements. It may for example be at least 10% or at least 20% of the cross-sectional dimension of the passage hole.

In one refinement, the shaft has, on a side averted from the valve flap, a second abutment surface is arranged plane-parallel with respect to the first abutment surface and on which a head of the screw is supported. It is self-evident that, for this purpose, the head of the screw does not need to lie directly on the second abutment surface, but a washer may for example possibly be arranged in between. By the two plane-parallel abutment surfaces, the unit formed by the valve flap and the screw can be displaced as a whole in the X-Y plane along the plane-parallel abutment surfaces until the desired alignment is attained.

In one refinement, a blind hole with a thread, into which the screw is screwed, is formed on the valve flap. By this solution, it is ensured that the alignment mechanism does not cause the valve flap to leak. Furthermore, on the side averted from the pivot axis, the valve flap may be of smooth and/or planar form, which may be advantageous in terms of flow dynamics in particular in the open position.

In one refinement, the shaft has two passage holes, which are arranged to both sides of a central axis of the line and in which in each case one screw is arranged. In particular, the two stated abutment surfaces may be designed to be of such a size that they surround the two passage holes, or in other words that a central section of the shaft is flattened from both sides. This, too, has advantages in terms of flow dynamics and can simplify the manufacture and the desired alignment of the valve flap relative to the shaft.

In one refinement, the alignment mechanism has an adhesive or welded fastening of the valve flap to the shaft. In this case, the valve flap can, before the assembly of the valve arrangement, be aligned in the desired manner and fixed by subsequent welding or curing of the adhesive. The welded fastening may be implemented in particular by laser welding, in particular in conjunction with a valve flap and a shaft that are produced from a thermoplastic material.

In one refinement, the shaft has a passage hole into which a peg formed on the valve flap is inserted, an annular gap being formed between the peg and the passage hole, which annular gap allows the alignment of the valve flap during the assembly of the valve arrangement and which annular gap is at least partially closed by adhesive bonding or welding during the fastening of the valve flap to the shaft. The described alignment of the valve flap in the X-Y plane is possible by way of the annular gap. The length of the peg and of the passage hole can be coordinated with one another such that the desired fastening is achieved even after the adjustment in the Z direction.

The above-stated object is likewise achieved by a fuel cell arrangement. The fuel cell arrangement is provided in particular for a motor vehicle drive and has at least one fuel cell and a gas line for the feed and/or discharge of gas to or from the at least one fuel cell. The fuel cell arrangement has a valve arrangement for shutting off the gas line by adjustment of the valve flap into the closed position. The fuel cell may in particular be a hydrogen fuel cell.

A motor vehicle has a line and a valve arrangement for shutting off the line by adjustment of the valve flap into the closed position, the line being in particular a gas line of a motor vehicle drive and/or of a fuel cell arrangement of the motor vehicle.

BRIEF DESCRIPTION OF THE DRAWINGS

The invention will be discussed in more detail below on the basis of exemplary embodiments illustrated in the figures. In the figures.

DETAILED DESCRIPTION OF THE PRESENTLY PREFERRED EMBODIMENTS

Figure 1:
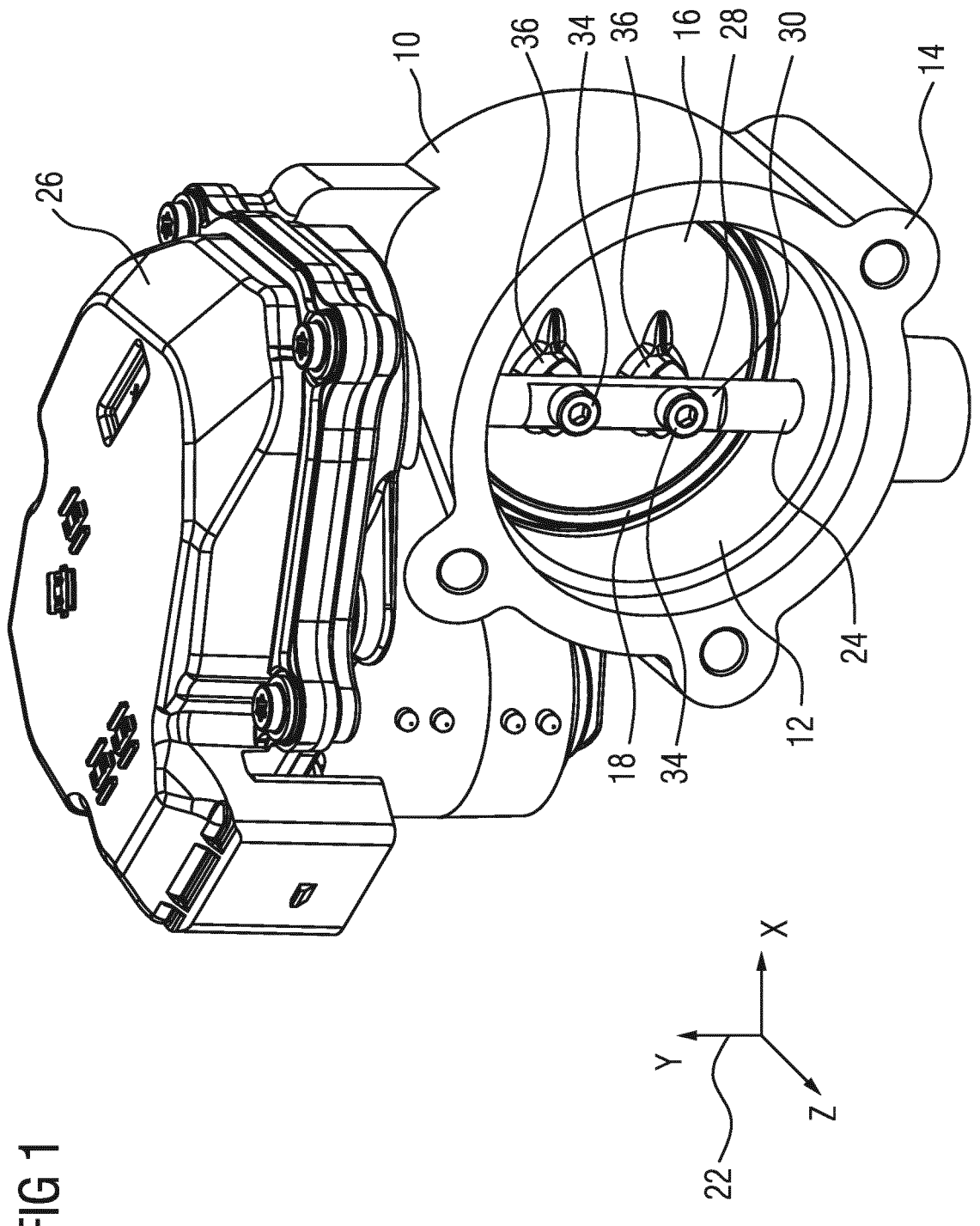
FIG. 1 is a valve arrangement in a perspective illustration.

The valve arrangement from FIG. 1 has a housing 10, through which a fluid line 12 is formed. The fluid line 12 has a circular cross section. Facing the viewer is a flange 14 of the housing 10, by which the valve arrangement can be connected to a further line piece. In FIG. 1, and in all of the other figures, a valve flap 16 is shown in its closed position. The valve flap 16 lies with its outer, circular edge against an elastic seal 18, which forms a valve seat.

The valve flap 16 is disk-shaped. In the closed position shown, the valve flap is arranged orthogonally with respect to a line axis 20 (see FIG. 2) of the fluid line 12 and defines an X-Y plane of a coordinate system 22 that is used for the further description of the respective directions. The line axis 20 is a central longitudinal axis of the fluid line 12 in the region of the valve flap 16.

Running parallel to the Y axis of said coordinate system 22 is a shaft 24 of the valve, which defines a pivot axis of the valve flap 16. The shaft 24 runs transversely through the fluid line 12 and is connected to an electric actuator 26, which is flange-mounted on the housing 10, of the valve arrangement. The electric actuator 26 serves as an actuating drive for the valve and can move the valve flap 16 back and forth between the closed position shown and an open position (not shown) by rotation of the shaft 24.

Figure 3:
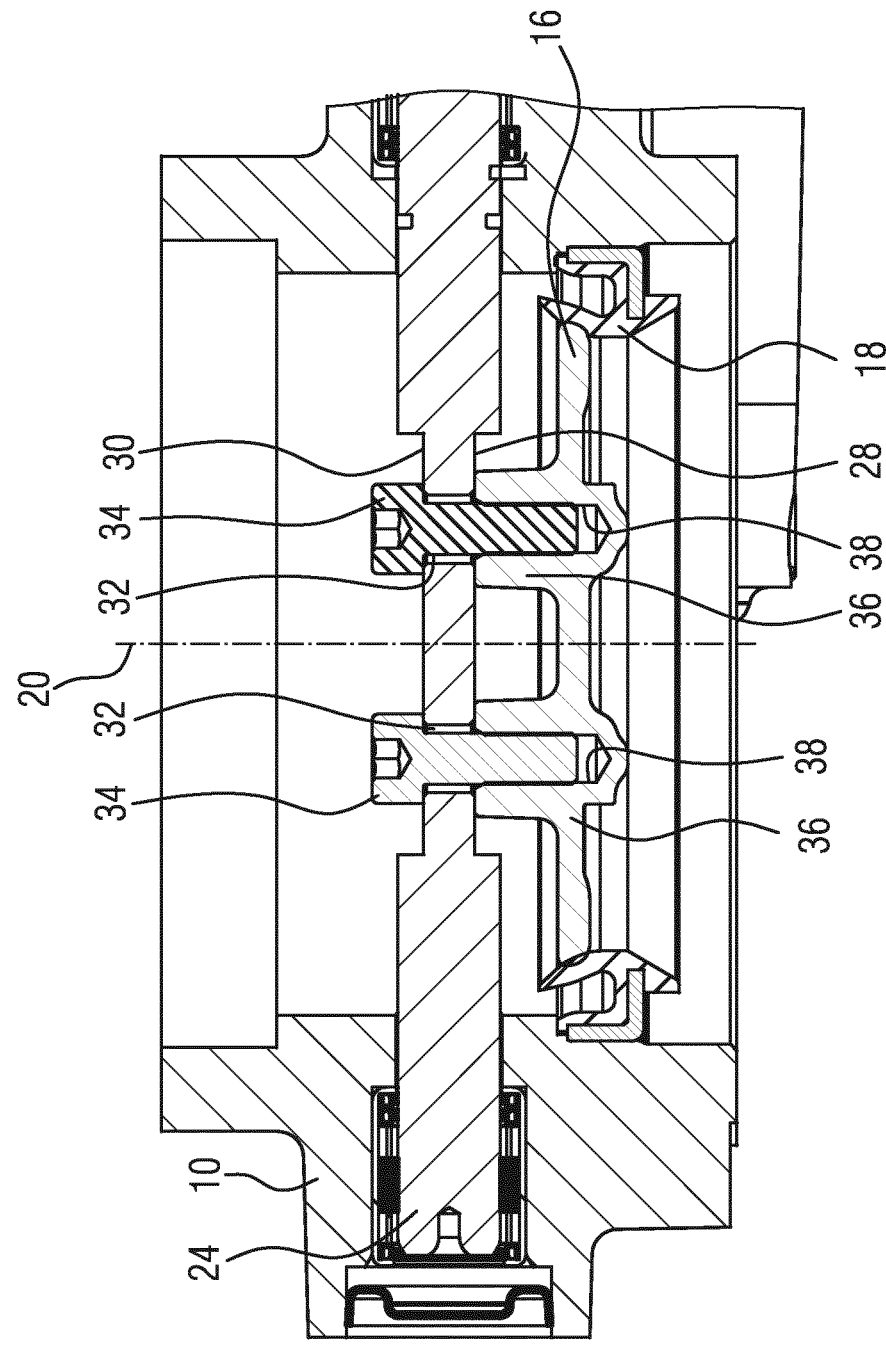
FIG. 3 is the valve arrangement from FIG. 1 in a sectional illustration.
Figure 3:
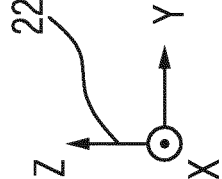
Figure 4:
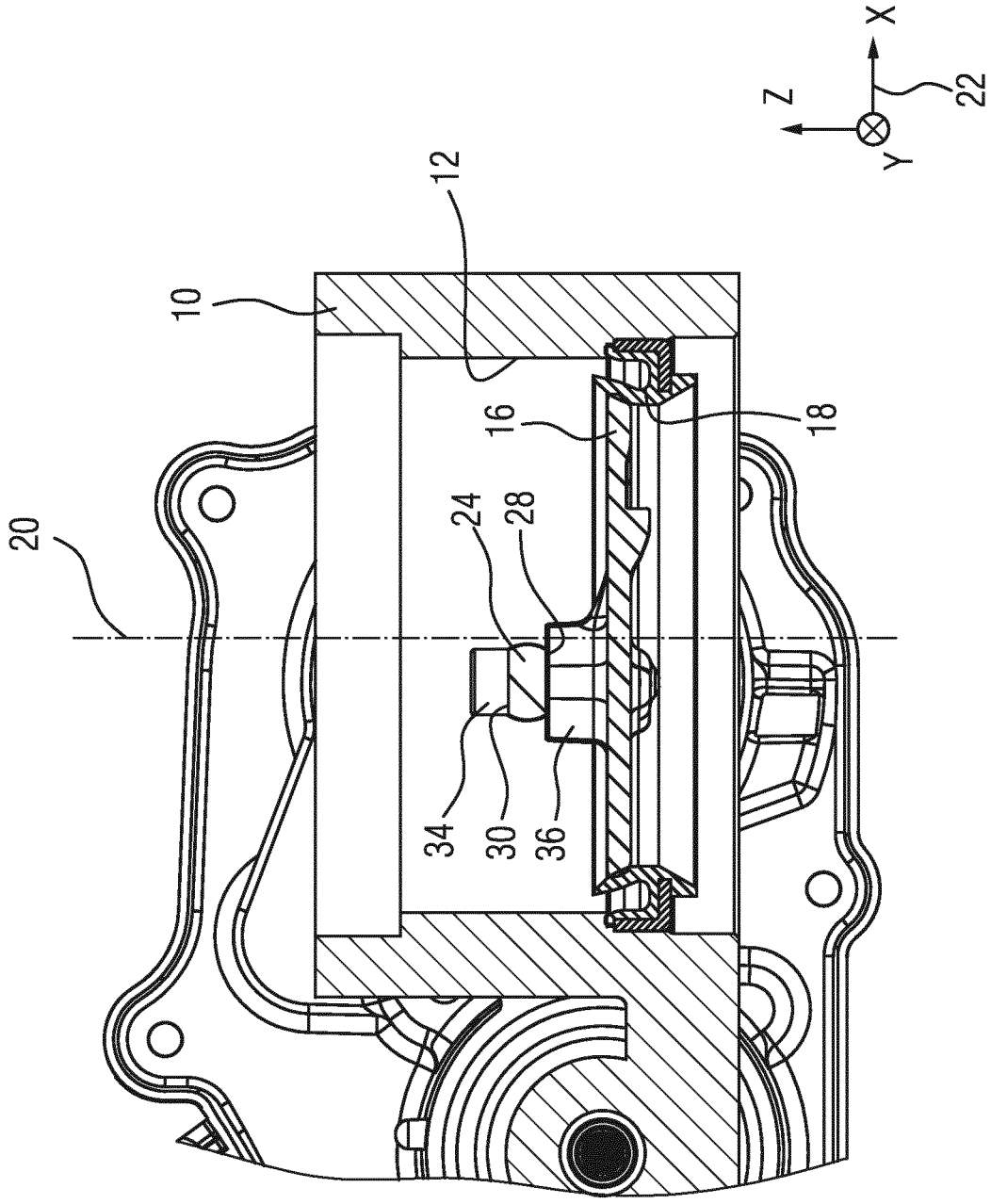
FIG. 4 is the valve arrangement from FIG. 1 in a further sectional illustration.
Figure 5:
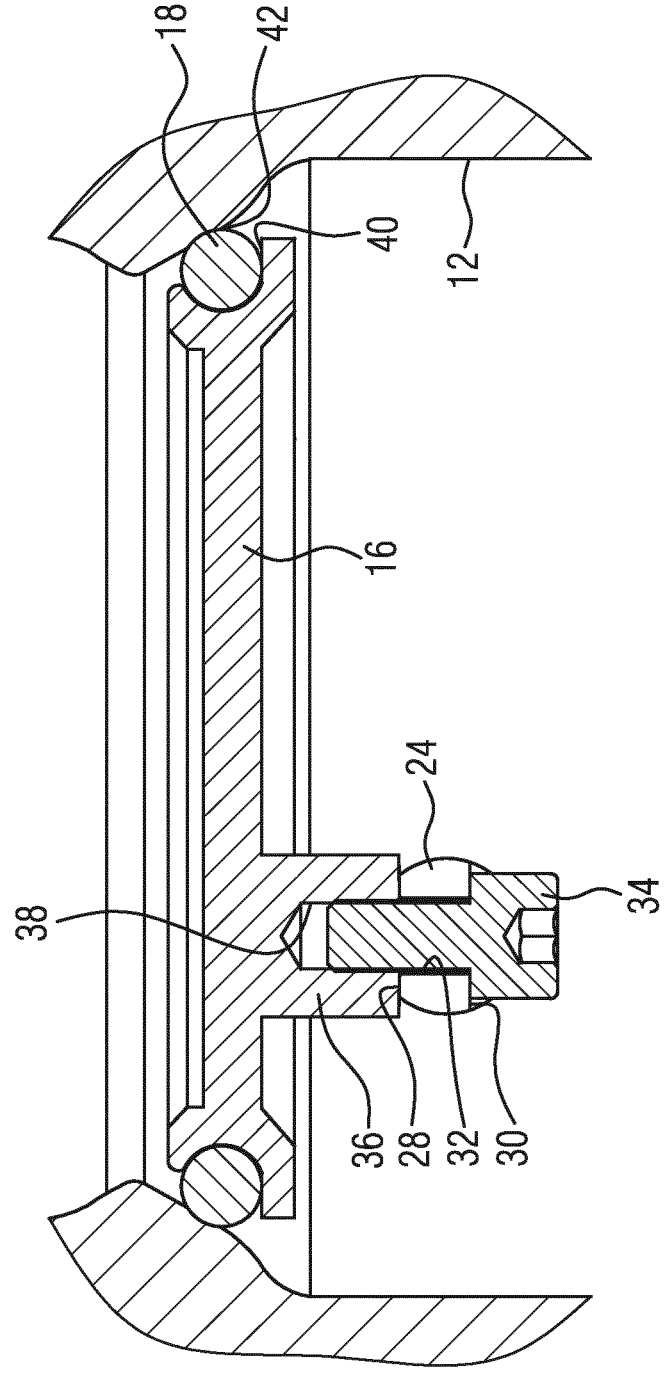
FIG. 5 is a valve arrangement in a sectional illustration.

The alignment mechanism for the alignment and fixing of the valve flap 16 relative to the valve seat is, in FIGS. 1 to 4 and in FIG. 5, implemented by a screw fastening of the valve flap 16 to the shaft 24. It can be seen in FIG. 1 that the shaft 24 has two plane-parallel abutment surfaces in a central section. A first, planar abutment surface 28 is, in FIG. 1, situated on that side of the shaft 24 which is averted from the viewer. A second, planar abutment surface 30 faces the viewer. With a spacing to both sides of the line axis and within the two abutment surfaces 28, 30, the shaft 24 has two passage holes 32 (see FIG. 3), through which in each case one screw 34 is led.

On that side of the valve flap 16, which faces the viewer in FIG. 1, and which also faces the shaft 24 and its first abutment surface 28, the valve flap 16 has two dome-like protrusions 36 in which there is formed in each case one blind hole 38 (see FIG. 3) with a thread, into which in each case one of the screws 34 is screwed. In this way, the valve flap 16 is braced together with the first abutment surface 28. Here, the inner diameter of the passage holes 32 is greater than the outer diameter of the screws 34, such that the screw connection has play in the X direction and in the Y direction. During the assembly of the valve arrangement, before the tightening of the screws 34, the valve flap 16 can thus be aligned in the X-Y plane and coordinated with the valve seat. The screws 34 are subsequently tightened, and the arrangement of the valve flap 16 relative to the valve seat is thus fixed.

Figure 2:
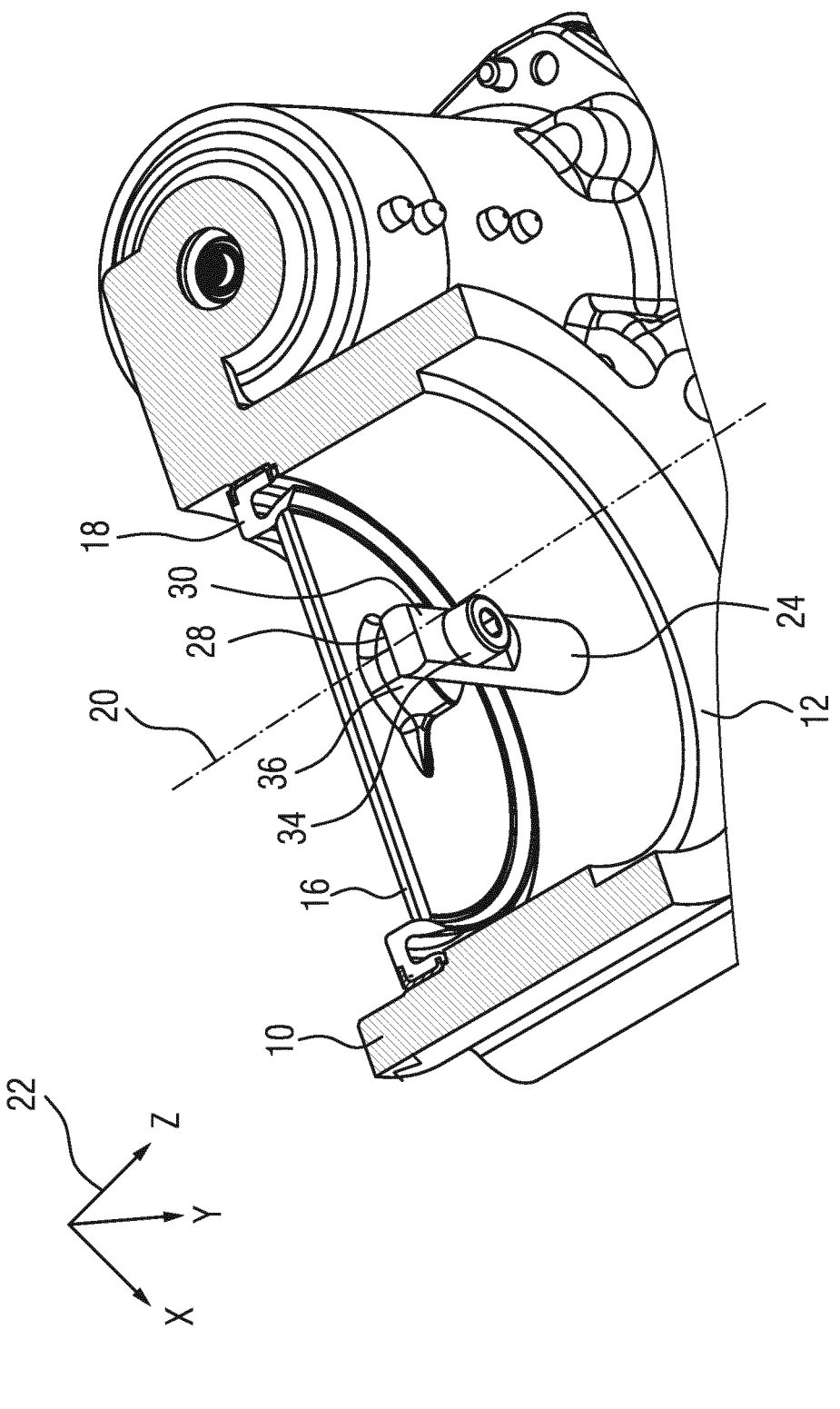
FIG. 2 is the valve arrangement from FIG. 1 in a further perspective illustration, partially in section.

FIG. 2 shows the line axis 20 of the fluid line 12. It can be seen that said line axis runs along the Z direction of the coordinate system 22 that is likewise shown. It is also possible to clearly see the flattened cross section of the shaft in the central longitudinal section with the two abutment surfaces 28, 30. It is likewise possible to clearly see the complex cross-section geometry of the encircling elastic seal 18, and that said seal 18 is inserted into the circular opening of the housing 10 that forms the fluid line 12. The shaft 24 runs along the pivot axis of the valve flap 16. The pivot axis is arranged with a spacing to the plane of the valve flap 16.

In the sectional illustration of FIG. 3, the section plane runs parallel to the X-Z plane. The main elements of the alignment mechanism can be clearly seen in FIG. 3. It can be seen that the inner diameters of the two passage holes 32 are considerably larger than the outer diameter of the screws 34, such that an alignment of the valve flap 16 relative to the valve seat in the X-Y plane is possible. It is also possible to clearly see that the valve flap 16 is braced together with the first abutment surface 28 by the screws 34 and that the heads of the screws 34 lie against the second abutment surface 30. The shaft 24 is mounted rotatably in the housing 10 and is connected to the electric actuator 26 (merely indicated on the right in FIG. 3).

FIG. 4 shows the arrangement from FIGS. 1 to 3 once again in a different section plane. This time, the section plane runs parallel to the X-Z plane of the coordinate system 22. It can be seen that the shaft 24 and thus the pivot axis of the valve flap 16 is arranged perpendicular to the line axis 20 of the fluid line 12 and so as to be laterally offset with respect thereto (in the X direction).

In FIG. 5, only a few elements of another valve arrangement are illustrated in section. It can be seen that the valve flap 16 has an encircling groove 40 into which an O-ring as elastic seal 18 is inserted. Said O-ring seals against the valve seat 42. As alignment mechanism, use is likewise made of a screw connection with a screw 34, which is inserted with play through a passage hole 32 in a shaft 24. The screw 34 is screwed into a blind hole 38 with a thread, which blind hole is formed in a dome-like protrusion 36 on the valve flap 16. In this exemplary embodiment, too, the shaft 24 has, on the side facing the valve flap 16, a planar abutment surface 28, together with which the valve flap 16 is braced by the screw 34, and a second abutment surface 30, which is oriented plane-parallel with respect to the first abutment surface 28 and against which the head of the screw 34 lies.

Figure 6:
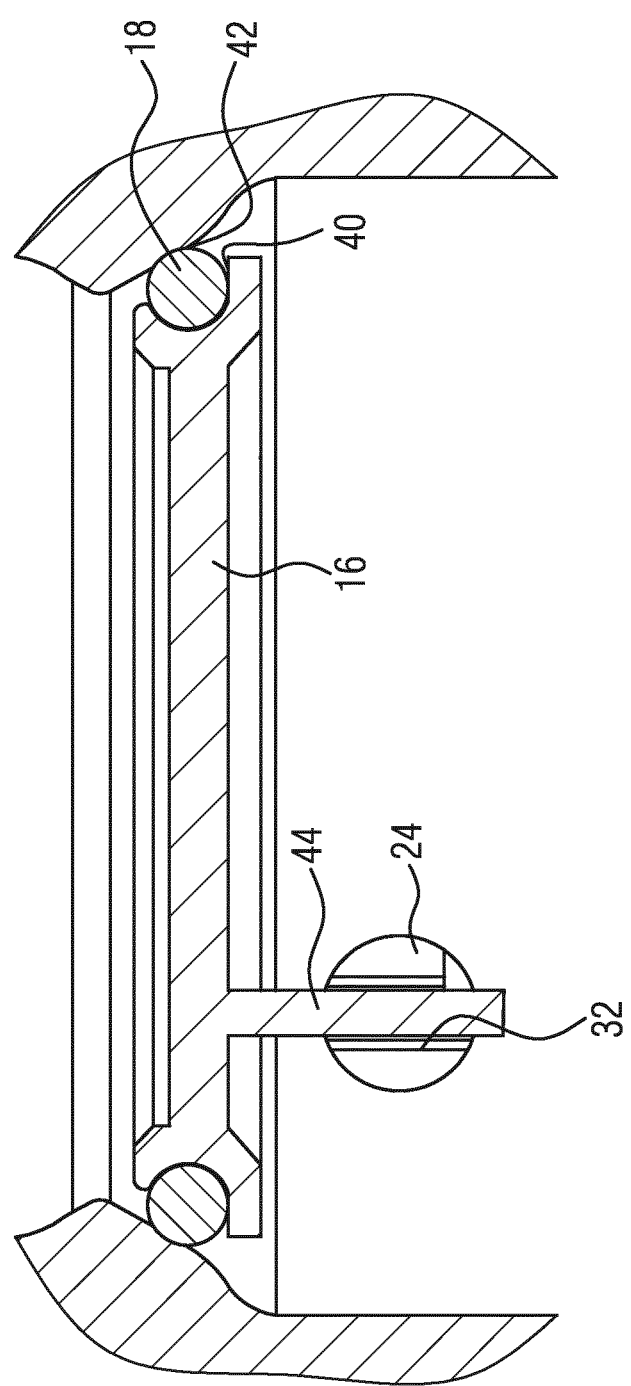
FIG. 6 is a valve arrangement, in a sectional illustration.

FIG. 6 likewise shows only selected elements of another valve arrangement in a sectional illustration. The valve flap 16 is, similarly to that from FIG. 5, equipped with an encircling groove 40 into which an elastic seal 18 in the form of an O-ring is inserted. However, a different alignment mechanism is provided, which does not have a screw connection. Instead of the screw connection, a peg 44 is formed on the valve flap 16, which peg is led through a passage hole 32 in the shaft 24. The diameter of the passage hole 32 is selected to be larger than the outer diameter of the peg 44, such that this arrangement also initially has such a degree of play that an alignment of the valve flap 16 relative to the valve seat 42 is possible, specifically in the X, Y and Z directions. After the desired alignment has been found, a permanent connection between the peg 44 and the shaft 24 is produced by laser welding, the annular gap formed between peg 44 and passage hole 32 being entirely or partially closed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve arrangement, comprising:
a housing with a fluid line;
a valve arranged in the fluid line having:
  a valve seat;
  a valve opening;
  a valve flap that is pivotable about a pivot axis between
    a closed position, in which the valve flap lies against
    the valve seat and closes the valve opening in
    fluid-tight fashion, and an open position, in which
    the valve flap opens up the valve opening;
  a shaft configured to pivot the valve flap; and
  a protrusion arranged on the valve flap entirely between
    the valve flap and the shaft and configured to space the
    valve flap apart from the shaft,
  wherein the shaft is in direct contact with a longitudinal
    end of the protrusion,
  wherein the valve flap, in the closed position, defines an
    X-Y plane of a coordinate system and the pivot axis is
    arranged with a spacing to the X-Y plane and defining
    a Y direction of the coordinate system, and
  an alignment mechanism by which an arrangement in
    which the valve flap is situated relative to the valve seat
    in the closed position is alignable and fixable at least in
    an X direction.

2. The valve arrangement as claimed in claim 1, wherein the arrangement in which the valve flap is situated relative to the valve seat in the closed position is additionally alignable and fixable in a Y direction by the alignment mechanism.

3. The valve arrangement as claimed in claim 1, wherein the arrangement in which the valve flap is situated relative to the valve seat in the closed position is additionally alignable and fixable in a Z direction by the alignment mechanism.

4. The valve arrangement as claimed in claim 1, wherein the alignment mechanism configured to fasten the valve flap to the shaft.

5. The valve arrangement as claimed in claim 4, wherein the alignment mechanism has a screw fastening of the valve flap to the shaft.

6. The valve arrangement as claimed in claim 5, wherein the shaft has at least one passage hole, in which a screw of the screw fastening is arranged, and a planar, first abutment surface, which surrounds the at least one passage hole at a side of the shaft facing toward the valve flap and which is braced together with the protrusion arranged on the valve flap by the screw fastening.

7. The valve arrangement as claimed in claim 6, wherein an outer diameter of the screw is smaller than a cross-sectional dimension of the at least one passage hole to allow an alignment in the X-Y plane.

8

8. The valve arrangement as claimed in claim 6, wherein a blind hole with a thread, into which the screw is screwed, is formed on the valve flap.

9. The valve arrangement as claimed in claim 5, wherein the shaft has two passage holes which are arranged to both sides of a line axis of the fluid line and in which in each case one screw is arranged.

10. The valve arrangement as claimed in claim 1, wherein the valve arrangement is configured for one or more of a gas line, a gas line of a fuel cell arrangement, and/or a motor vehicle drive arrangement.

11. A valve arrangement, comprising:
a housing with a fluid line;
a valve arranged in the fluid line having:
  a valve seat;
  a valve opening;
  a valve flap that is pivotable about a pivot axis between
    a closed position, in which the valve flap lies against
    the valve seat and closes the valve opening in
    fluid-tight fashion, and an open position, in which
    the valve flap opens up the valve opening;
a shaft configured to pivot the valve flap; and
a protrusion arranged on the valve flap and configured to
  space the valve flap apart from the shaft,
wherein the valve flap, in the closed position, defines an
  X-Y plane of a coordinate system and the pivot axis is
  arranged with a spacing to the X-Y plane and defining
  a Y direction of the coordinate system, and
an alignment mechanism by which an arrangement in
  which the valve flap is situated relative to the valve seat
  in the closed position is alignable and fixable at least in
  an X direction,
wherein the alignment mechanism configured to fasten
  the valve flap to the shaft,
wherein the alignment mechanism has a screw fastening
  of the valve flap to the shaft,
wherein the shaft has at least one passage hole, in which
  a screw of the screw fastening is arranged, and a planar,
  first abutment surface, which surrounds the at least one
  passage hole at a side of the shaft facing toward the
  valve flap and which is braced together with the pro-
  trusion arranged on the valve flap by the screw fasten-
  ing,
wherein an outer diameter of the screw is smaller than a
  cross-sectional dimension of the at least one passage
  hole to allow an alignment in the X-Y plane,
wherein the shaft has, on a side averted from the valve
  flap, a second abutment surface which is arranged
  plane-parallel with respect to the first abutment surface
  and on which a head of the screw is supported.

12. A fuel cell arrangement, comprising:
at least one fuel cell;
a gas line configured to feed and/or discharge gas to
  and/or from the at least one fuel cell; and
a valve arrangement, comprising:
a housing with a fluid line;
a valve arranged in the fluid line having:
  a valve seat;
  a valve opening;
  a valve flap that is pivotable about a pivot axis between
    a closed position, in which the valve flap lies against
    the valve seat and closes the valve opening in
    fluid-tight fashion, and an open position, in which
    the valve flap opens up the valve opening;
  a shaft configured to pivot the valve flap; and a protrusion arranged on the valve flap entirely between the valve flap and the shaft and configured to space the valve flap apart from the shaft, wherein the shaft is in direct contact with a longitudinal end of the protrusion, wherein the valve flap, in the closed position, defines an X-Y plane of a coordinate system and the pivot axis is arranged with a spacing to the X-Y plane and defining a Y direction of the coordinate system, and an alignment mechanism by which an arrangement in which the valve flap is situated relative to the valve seat in the closed position is alignable and fixable at least in an X direction, wherein the valve is configured to shut off the gas line by adjustment of the valve flap into the closed position.

13. A motor vehicle, comprising:

a line;

a valve arrangement, comprising:

a housing with a fluid line;

a valve arranged in the fluid line having:

a valve seat;

a valve opening;

a valve flap that is pivotable about a pivot axis between a closed position, in which the valve flap lies against the valve seat and closes the valve opening in fluid-tight fashion, and an open position, in which the valve flap opens up the valve opening;

a shaft configured to pivot the valve flap; and a protuberance arranged on the valve flap entirely between the valve flap and the shaft and configured to space the valve flap apart from the shaft, wherein the shaft is in direct contact with a longitudinal end of the protuberance, wherein the valve flap, in the closed position, defines an X-Y plane of a coordinate system and the pivot axis is arranged with a spacing to the X-Y plane and defining a Y direction of the coordinate system, and an alignment mechanism by which an arrangement in which the valve flap is situated relative to the valve seat in the closed position is alignable and fixable at least in an X direction, wherein the valve arrangement is configured to shut off the line by adjustment of the valve flap into the closed position, the line being one or more of a gas line of a motor vehicle drive and/or of a fuel cell arrangement of the motor vehicle.

\* \* \* \* \*